(12) United States Patent
Hitchcock et al.

(10) Patent No.: US 10,414,480 B2
(45) Date of Patent: Sep. 17, 2019

(54) SIDEWALL MOUNTING HARDWARE FOR AIRCRAFT

(71) Applicant: The Boeing Company, Chicago, IL (US)

(72) Inventors: Cory M. Hitchcock, Granite Falls, WA (US); Thomas S. Perkins, Renton, WA (US); Erik Ivar Wiman, Shoreline, WA (US); Gregory A. Tubbs, Marysville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/177,006

(22) Filed: Oct. 31, 2018

(65) Prior Publication Data

US 2019/0071162 A1    Mar. 7, 2019

Related U.S. Application Data

(63) Continuation of application No. 15/091,962, filed on Apr. 6, 2016, now Pat. No. 10,137,975.

(51) Int. Cl.
*B64C 1/06* (2006.01)
*F16B 21/09* (2006.01)

(52) U.S. Cl.
CPC .............. *B64C 1/061* (2013.01); *B64C 1/066* (2013.01); *F16B 21/09* (2013.01)

(58) Field of Classification Search
CPC .............................. B64C 1/061; B64C 1/066; B64D 2011/0046; F16B 5/0036; F16B 21/09; B62D 25/02; B60R 13/0206; B60R 2013/0293
See application file for complete search history.

(56) References Cited

U.S. PATENT DOCUMENTS

| | | | | |
|---|---|---|---|---|
| 4,150,465 A | * | 4/1979 | Gavin, Jr. ........... | E04F 13/0837 403/353 |
| 4,317,416 A | * | 3/1982 | Baum ..................... | F16B 12/22 108/157.1 |
| 4,783,034 A | * | 11/1988 | Ostrander ............... | F16B 21/09 248/221.12 |
| 5,052,846 A | * | 10/1991 | Behshid .................. | A01K 3/00 403/188 |
| 6,010,306 A | * | 1/2000 | Bucher ................. | F04D 25/088 416/210 R |
| 6,754,992 B1 | * | 6/2004 | Byfield ................. | E04B 1/2403 403/205 |

(Continued)

*Primary Examiner* — Assres H Woldemaryam
(74) *Attorney, Agent, or Firm* — Duft & Bornsen, PC

(57) ABSTRACT

Systems and methods are provided for securing aircraft sidewall. One embodiment comprises a hanger for supporting sections of sidewall for an aircraft. The hanger includes an elongated vertical member that attaches to a frame of the aircraft, and sets of keyholes that are each arranged in a vertical pattern along the member and that are each configured to support a corresponding section of sidewall of the aircraft. Each keyhole includes a receptacle dimensioned to receive a fitting from a section of sidewall, and a slot dimensioned to slidably accept the fitting via the receptacle to secure the fitting in place. The slot size of keyholes in each set varies from one end of the vertical pattern to another end of the vertical pattern.

20 Claims, 19 Drawing Sheets

(56) References Cited

U.S. PATENT DOCUMENTS

| | | | | |
|---|---|---|---|---|
| 8,197,216 B2* | 6/2012 | Wang | ................... | F04D 29/646 416/210 R |
| 2006/0251473 A1* | 11/2006 | Tyski | .................... | A47B 57/50 403/408.1 |
| 2007/0215780 A1* | 9/2007 | Eichert | ................. | A47G 1/142 248/497 |
| 2007/0252041 A1* | 11/2007 | Ebner | .................... | B64C 1/066 244/131 |
| 2009/0016807 A1* | 1/2009 | Koch | ..................... | F16B 21/09 403/26 |
| 2012/0321230 A1* | 12/2012 | Chen | ...................... | F16B 21/09 384/41 |
| 2013/0062489 A1* | 3/2013 | DiNello | .................... | F16B 2/20 248/224.8 |
| 2013/0287482 A1* | 10/2013 | Busch | .................. | B64C 1/066 403/287 |
| 2015/0144201 A1* | 5/2015 | Chasen | ................ | B64D 33/02 137/15.1 |
| 2015/0330437 A1* | 11/2015 | Clouser | .................. | F16B 47/00 248/206.3 |
| 2016/0069374 A1* | 3/2016 | Hernandez | ............ | F16B 33/002 411/366.1 |
| 2016/0138627 A1* | 5/2016 | Bellido Jose | ...... | A47B 47/0066 428/100 |

* cited by examiner

SIDEWALL MOUNTING HARDWARE FOR AIRCRAFT

FIELD

The disclosure relates to the field of aircraft, and in particular, to sidewalls for aircraft cabins.

BACKGROUND

Aircraft sidewalls cover the insulation and frame of an aircraft in order to keep these components from the view of passengers, while also providing a mounting point for desired equipment and features. Tools such as screwdrivers or rivet guns are often used to install sidewalls. However, if the frame of an aircraft is not manufactured precisely according to tolerances, slight variations in distance between frame elements may make it difficult for the sidewall to properly align with locations on the frame that the sidewall should be mounted to. For example, a bolt for installing a sidewall may not properly align with a receptacle found in the frame of a completed aircraft. This increases the cost and labor associated with sidewall installation, which is undesirable. Thus, enhanced techniques and systems for sidewall installation are desired to reduce the cost and complexity of aircraft assembly and repair.

SUMMARY

Embodiments described herein provide for hangers that use keyholes with varying slot and receptacle sizes to enable tool-less installation of aircraft sidewalls. Furthermore, since the slot and receptacle sizes of the keyholes vary, a technician is not required to perfectly align the sidewall with each and every keyhole at once. This saves time and effort on the technician's part, as the technician may start by snapping a fitting on the sidewall into one keyhole, and then "walking" fittings on the sidewall into the remaining keyholes.

One embodiment comprises a hanger for supporting sections of sidewall for an aircraft. The hanger includes an elongated vertical member that attaches to a frame of the aircraft, and sets of keyholes that are each arranged in a vertical pattern along the member. Each keyhole includes a receptacle and a slot extending from the receptacle. The slot size of keyholes in each set varies (e.g., length decreases) from one end of the vertical pattern to another end of the vertical pattern.

A further embodiment is a system that includes a first hanger secured to a frame of an aircraft, a second hanger secured to the frame, and a section of aircraft sidewall. The section of sidewall includes multiple fittings along a fore side secured to the first hanger, and multiple fittings along an aft side secured to the second hanger. Each of the hangers includes an elongated vertical member that attaches to a frame of the aircraft, and a set of keyholes that is arranged in a vertical pattern along the member and that is configured to support the section of sidewall. Each keyhole includes a receptacle dimensioned to receive one of the fittings, and a slot dimensioned to slidably accept the fitting via the receptacle to secure the fitting in place. The slot size of keyholes in the set varies (e.g., length decreases) from one end of the vertical pattern to another end of the vertical pattern.

A further embodiment is a method for securing a section of aircraft sidewall. The method includes aligning a first fore fitting of the section with a receptacle of a keyhole of a first hanger affixed to an airframe, aligning a first aft fitting of the section with a receptacle of a keyhole of a second hanger affixed to the airframe, and pressing the fore and aft fittings into the receptacles of the keyholes. The method further includes sliding the first fore and aft fittings into slots of the keyholes to secure the fittings in the keyholes. The method also includes aligning an additional fore fitting of the section with a receptacle of a keyhole while the first fore fitting remains within a corresponding slot, progressively reducing an amount of float experienced by the section with respect to the hangers. The method further includes aligning an additional aft fitting of the section with a receptacle of a keyhole of while the first aft fitting remains within a corresponding slot, further progressively reducing the amount of float experienced by the section with respect to the hangers.

A further embodiment is a method comprising aligning a fitting in a section of aircraft sidewall with a keyhole in a hanger attached to a frame element of an aircraft, visually monitoring alignment of the fitting with keyhole, pressing the fitting into a receptacle of the keyhole; and sliding the fitting into a slot of the keyholes to secure the fitting in the keyhole A still further embodiment comprises a method. The method includes aligning a first fore fitting of a section of aircraft sidewall with a receptacle of a keyhole of a first hanger affixed to an airframe while visually monitoring alignment of the first fore fitting with the keyhole of the first hanger, and aligning a first aft fitting of the section with a receptacle of a keyhole of a second hanger affixed to the airframe while visually monitoring alignment of the first aft fitting with the keyhole of the second hanger.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
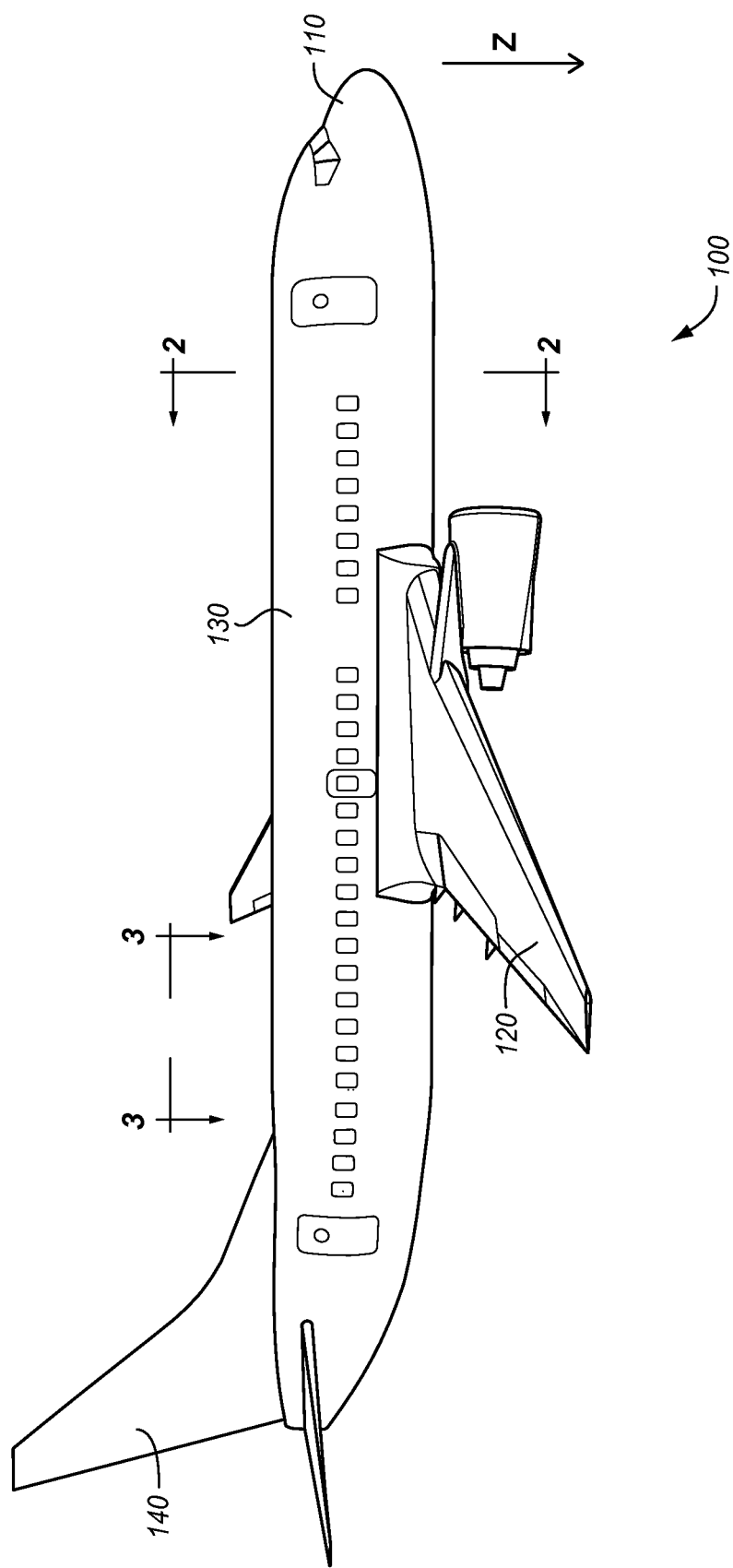
FIG. 1 is a diagram of an aircraft in an exemplary embodiment.
Figure 2:
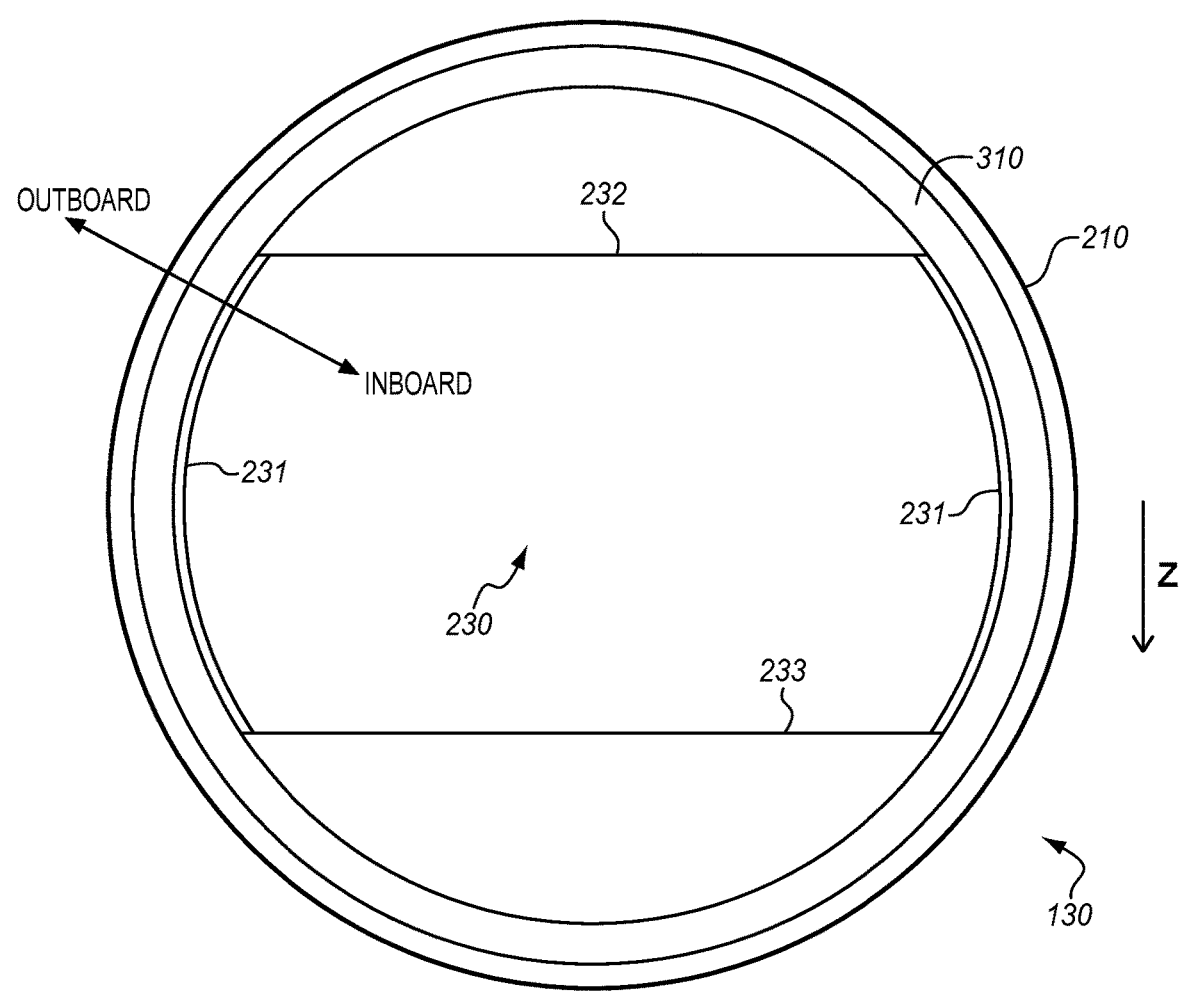
FIG. 2 is a section cut front view of a frame of an aircraft in an exemplary embodiment.
Figure 3:
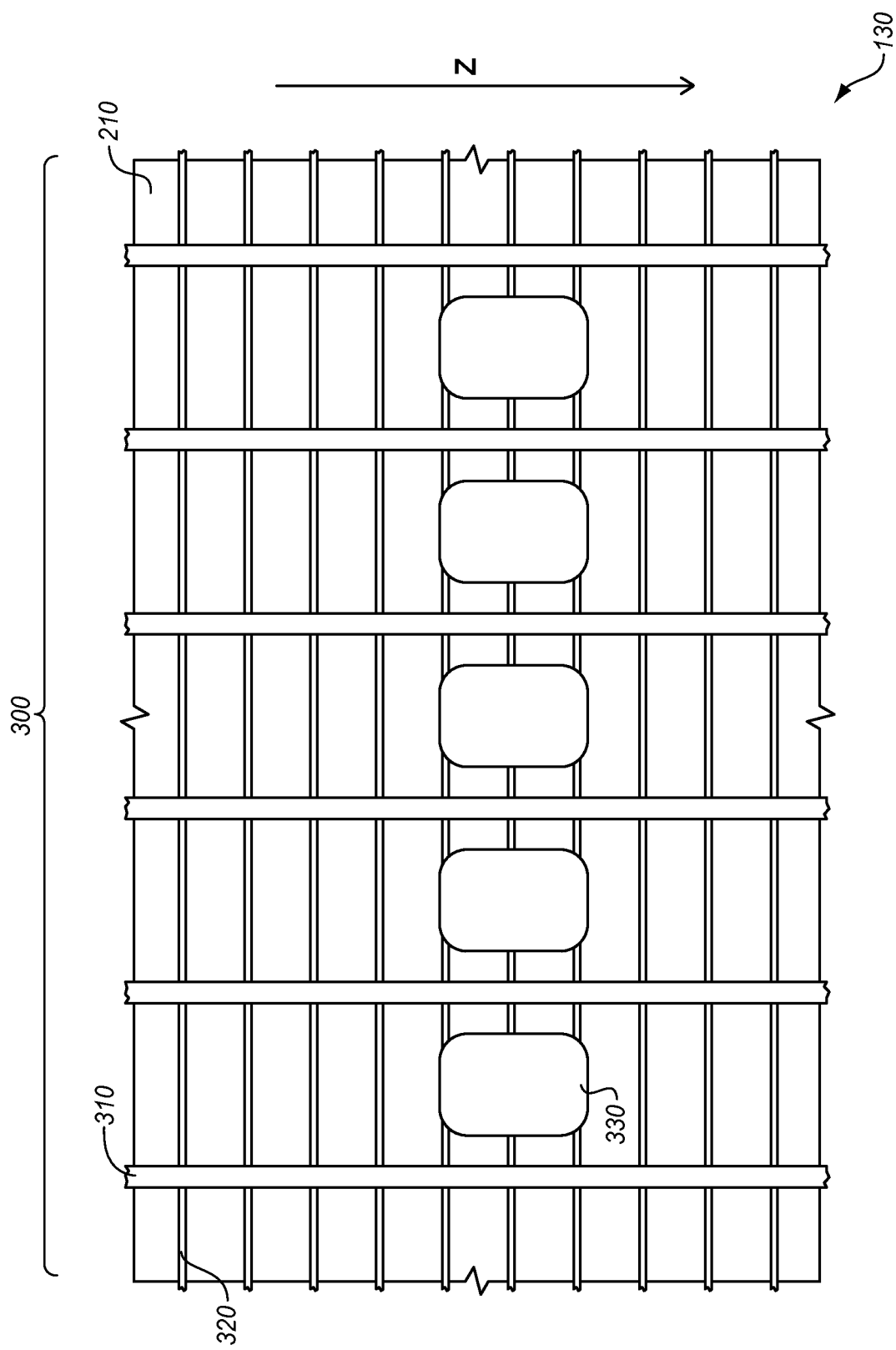
FIG. 3 is a section cut side view of a frame of an aircraft in an exemplary embodiment.

FIGS. 1-3 illustrate the structure of an exemplary aircraft which may utilize enhanced hangers to attach sections of sidewall to an airframe. Specifically, FIG. 1 is a diagram of an aircraft 100 in an exemplary embodiment. Aircraft 100 includes nose 110, wings 120, fuselage 130, and tail 140. FIG. 1 also illustrates a downward direction (Z) for aircraft 100.

FIG. 2 is a cross-section view of aircraft 100 indicated by view arrows 2 in FIG. 1. FIG. 2 illustrates a circular portion of aircraft fuselage 130. Fuselage 130 includes floor 233, ceiling 232, and sidewalls 231, which form cabin 230. FIG. 2 illustrates that an outboard direction proceeds towards an external surface (e.g., skin 210) of aircraft 100, and an inboard direction proceeds towards the interior (e.g., cabin 230) of aircraft 100. As shown in FIG. 2, frame elements 310 surround cabin 230, and skin 210 surrounds frame elements 310.

FIG. 3 is a diagram illustrating a section of fuselage 130 of aircraft 100 in an exemplary embodiment. FIG. 3 is a view shown by view arrows 3 in FIG. 1. In FIG. 3, various structural components (310, 320, 330, 210) are illustrated without insulation for clarity. For example, FIG. 3 illustrates that airframe 300 includes stringers 320 and frame elements 310, which may be curved. Stringers 320 provide longitudinal support to skin 210, while frame elements 310 (e.g., ribs of the aircraft) provide hoop-wise skin support. In one embodiment, frame elements 310 are spliced together to wrap around the fuselage in the hoopwise direction. In a further embodiment, stringers 320 are spliced together and run longitudinally from nose to tail. Frame elements 310 may also be referred to as frames 310. Windows 330 penetrate through skin 210.

Figure 4:
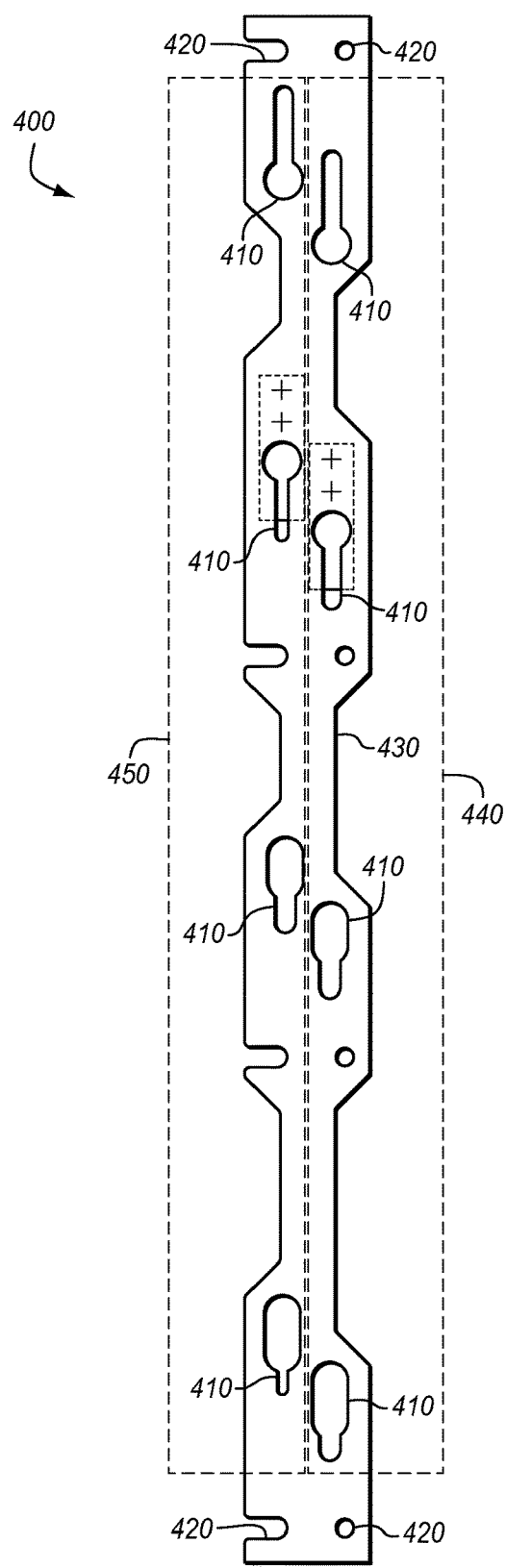
FIG. 4 illustrates a hanger configured to attach a sidewall to a frame of an aircraft in an exemplary embodiment.

FIG. 4 illustrates an enhanced hanger 400 which will be installed onto frame elements 310. Upon attachment to a frame element 310, hanger 400 may be utilized to attach sections of sidewall 231 to airframe 300 of aircraft 100. Hanger 400 is formed from an elongated vertical member 430, and is dimensioned to attach to a frame element 310 (e.g., a curved frame element 310). Vertical member 430 includes multiple keyholes 410 that enable a section of sidewall 231 (e.g., section 700 of FIG. 7) to affix itself to airframe 300. Specifically, set 440 of keyholes 410 are arranged in a vertical pattern to enable the attachment/ securement of a left side of one section of sidewall to hanger 400, while set 450 of keyholes 410 are arranged in a separate vertical pattern to enable the attachment/securement of a right side of another section of sidewall to hanger 400 (e.g., as shown later on in FIG. 9). Set 440 is vertically and laterally offset from set 450. Note that FIG. 4, and/or all of the FIGS. provided herein, may not be to scale with respect to all embodiments.

Figure 5:
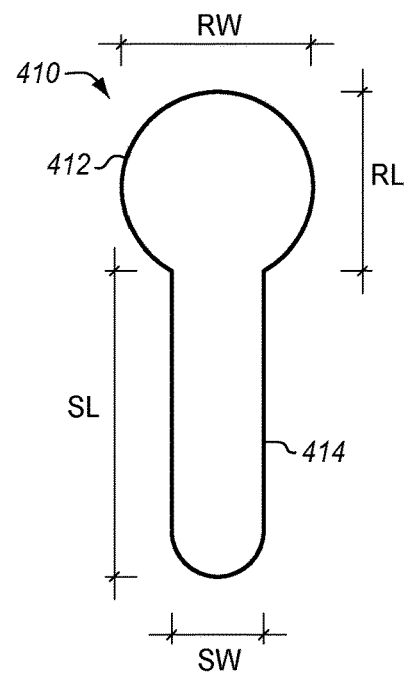
FIG. 5 illustrates a keyhole of the hanger of FIG. 4 in an exemplary embodiment.

The keyholes 410 of hanger 400 are enhanced in that they have varying sizes. As shown in FIG. 5, each keyhole 410 includes a receptacle 412 into which a corresponding fitting may be inserted, and a slot 414 extending from the receptacle 412, into which the fitting may be slid in order to hold/secure the fitting in place. Receptacle 412 of keyhole 410 may be defined by a receptacle width (RW) in combination with a receptacle length (RL). Meanwhile, slot 414 is defined by slot width (SW) in combination with a slot length (SL). Each keyhole 410 in a set may exhibit a different combination of slot 414 size and receptacle 414 size (e.g., length and/or width) than each other keyhole in the set. Thus, from one end of a vertical pattern to another end, keyhole slot size in the form of length and/or width may vary. As used herein, a "keyhole" is a hole in member 430 for receiving and securing a corresponding feature at a sidewall to hanger 400. Furthermore, as used herein, a "fitting" comprises any suitable component dimensioned to secure itself with respect to motion along at least one axis while secured in a slot of a keyhole (e.g., a fitting may comprise a "mushroom fitting"). Hanger 400 may be affixed to a frame element 310 via fixation elements 420. In this embodiment, fixation elements 420 comprise cut-outs dimensioned to receive hardware attaching hanger 400 to airframe 300, in order to affix hanger 400 to a frame element 310.

Figure 6:
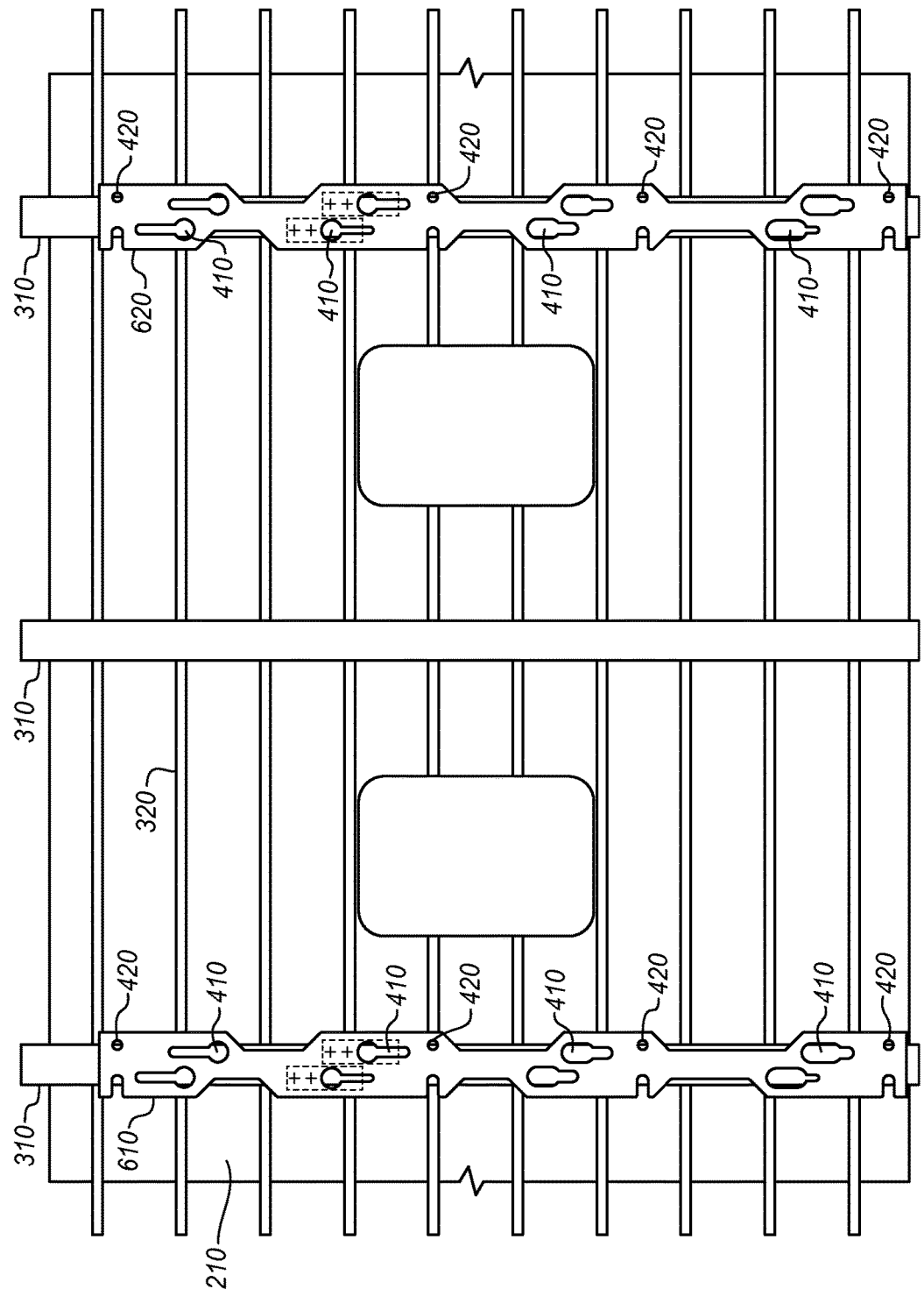
FIG. 6 illustrates the hanger of FIG. 4 attached to the frame of FIG. 3 in an exemplary embodiment.

FIG. 6 illustrates multiple hangers (610, 620) affixed/ engaged to frame elements 310 via fixation elements 420. When a section of sidewall (e.g., sidewall 700 of FIG. 7) is installed between hangers 610 and 620, keyholes 410 on the right side of hanger 610 and keyholes 410 on the left hand side of hanger 620 will mate with corresponding features on the section of sidewall, in order to securely fasten/secure the section of sidewall in place.

Figure 7:
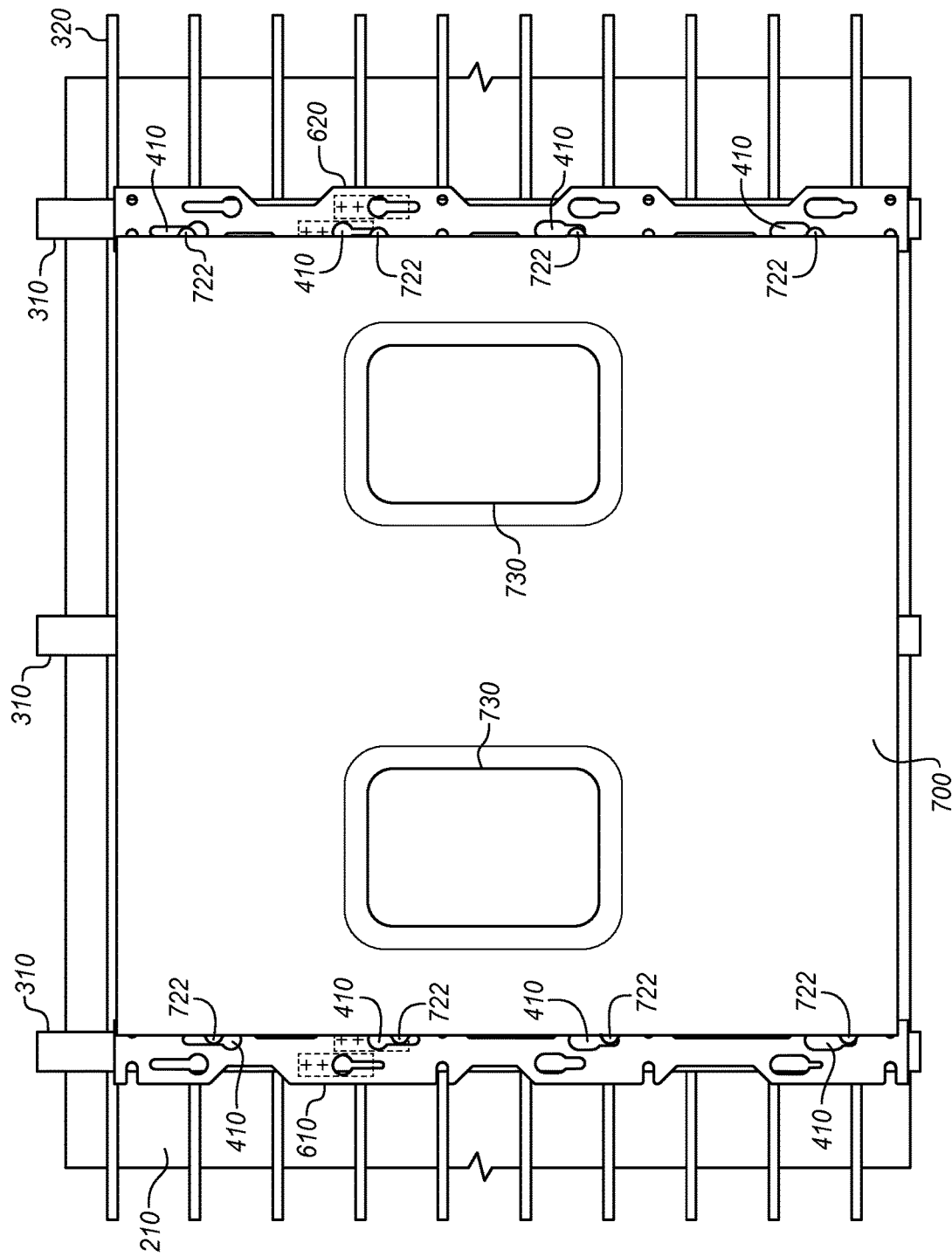
FIG. 7 illustrates a front of a section of sidewall fixed to a frame of an aircraft in an exemplary embodiment.

FIG. 7 illustrates a front view of a section 700 of sidewall secured to frame elements 310 of aircraft 100 in an exemplary embodiment. As shown in FIG. 7, section 700 of sidewall is dimensioned to ensure that even when section 700 is installed, keyholes 410 remain visible. This ensures that keyholes 410 may be seen during installation, enhancing the ability of a technician to install section 700 onto hangers 610 and 620 (e.g., by aligning fittings 722 with keyholes 410). In this embodiment, section 700 further includes cut-outs 730, which align with windows 330 of FIG. 3 an enable a passenger to view the exterior surroundings in which aircraft 100 is located.

Figure 8:
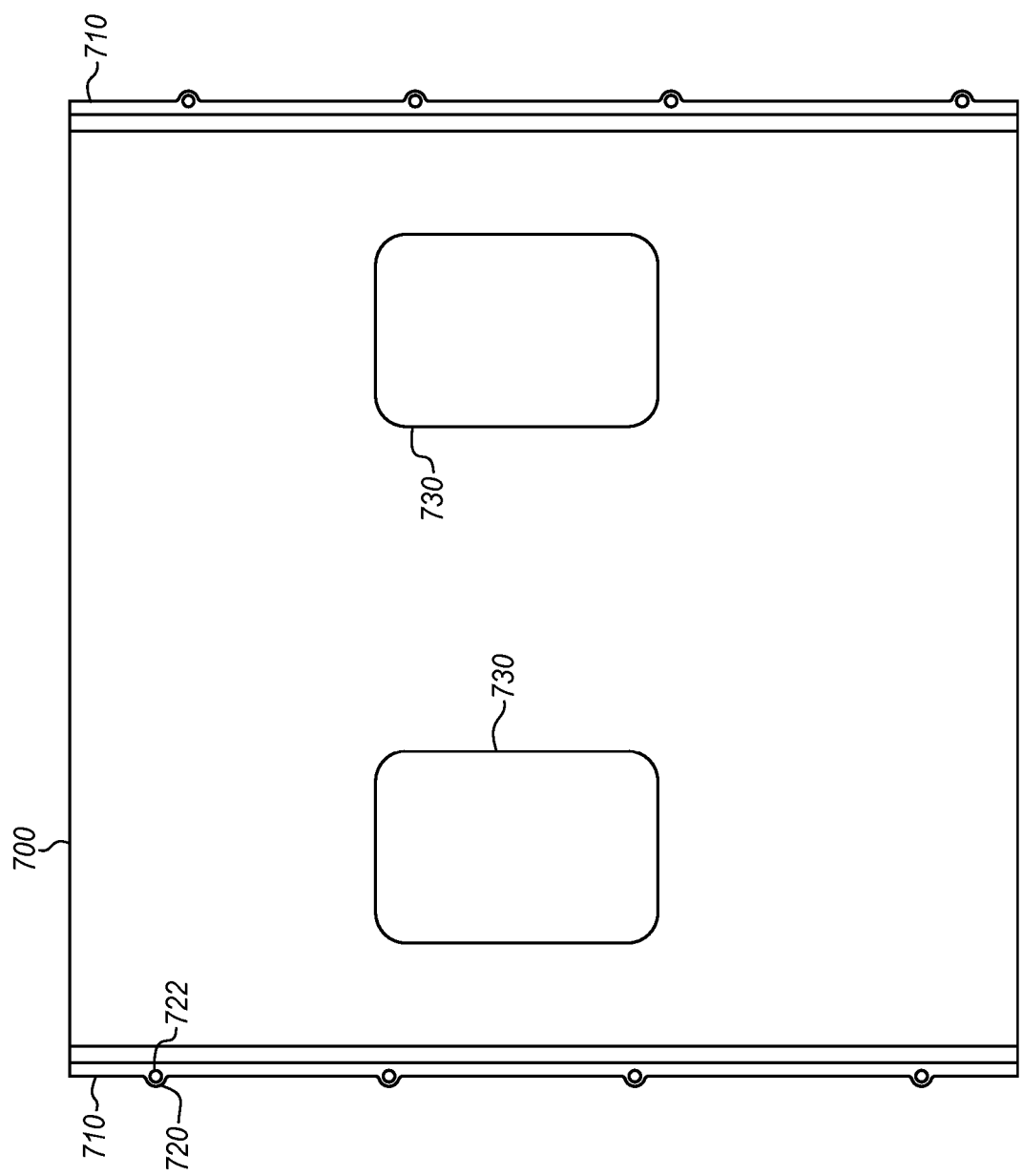
FIG. 8 illustrates a back of a section of sidewall in an exemplary embodiment.

FIG. 8 illustrates a back of a section 700 of sidewall in an exemplary embodiment. Specifically, FIG. 8 is the view that would result if section 700 of FIG. 7 was viewed from its outboard side. As shown in FIG. 8, the back of section 700 includes edge retainers 710. Each edge retainer 710 travels vertically along the sides of section 700. At locations that are vertically staggered with respect to each other, edge retainers 700 include protrusions 720. Each protrusion 720 includes a fitting 722, such as a mushroom fitting dimensioned to mate with a keyhole (e.g., a keyhole 410 of hanger 400 of FIG. 4).

Figure 9:
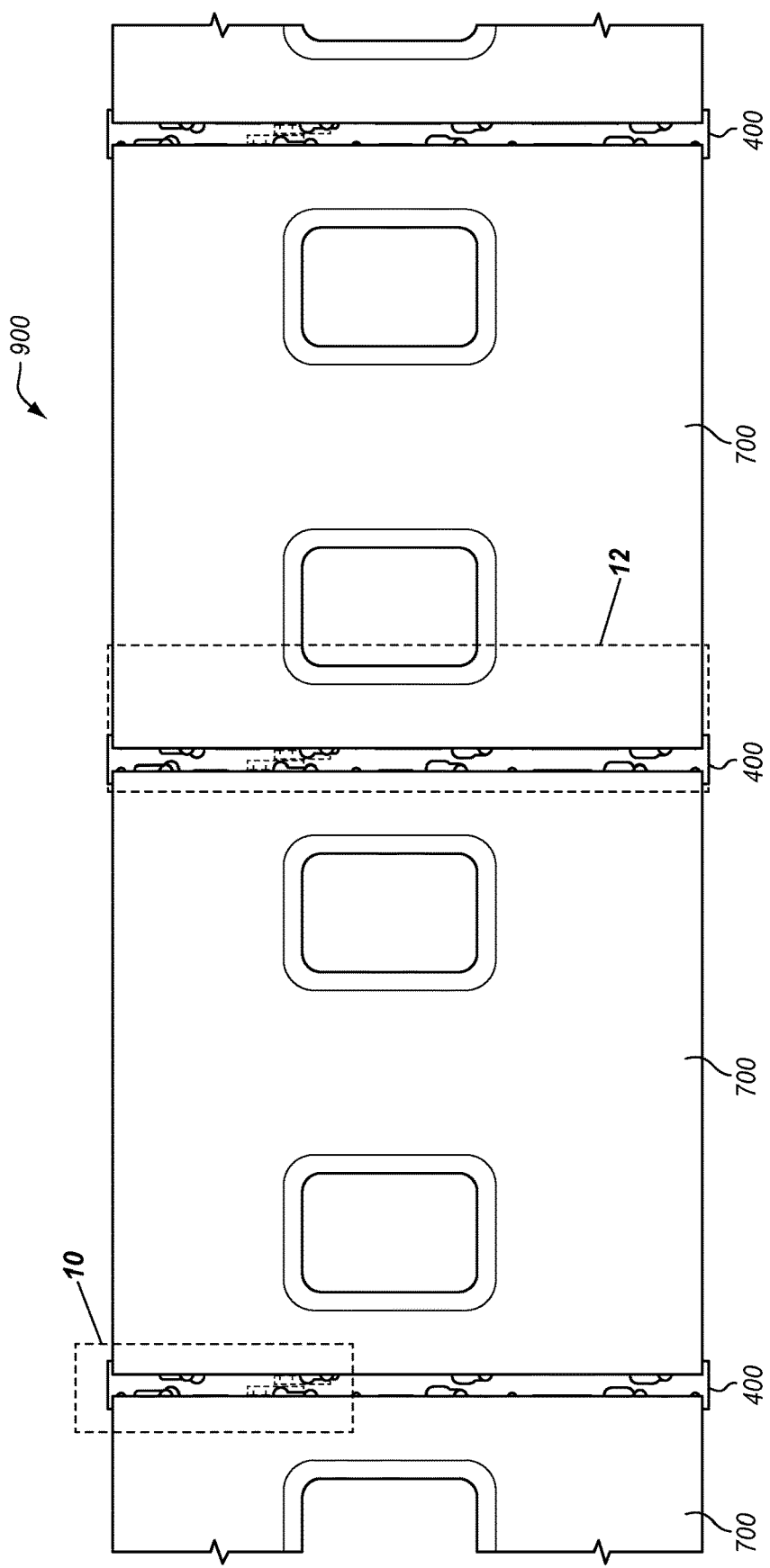
FIG. 9 illustrates multiple sections of sidewall secured to hangers of an aircraft in an exemplary embodiment.

FIG. 9 illustrates multiple sections 700 of sidewall secured to hangers 400 in aircraft 100 in an exemplary embodiment. When multiple sections 700 are attached, they form a continuous sidewall 900. This result is aesthetically pleasing, and prevents passengers from having to view insulation and/or structural features of aircraft 100.

Figure 10:
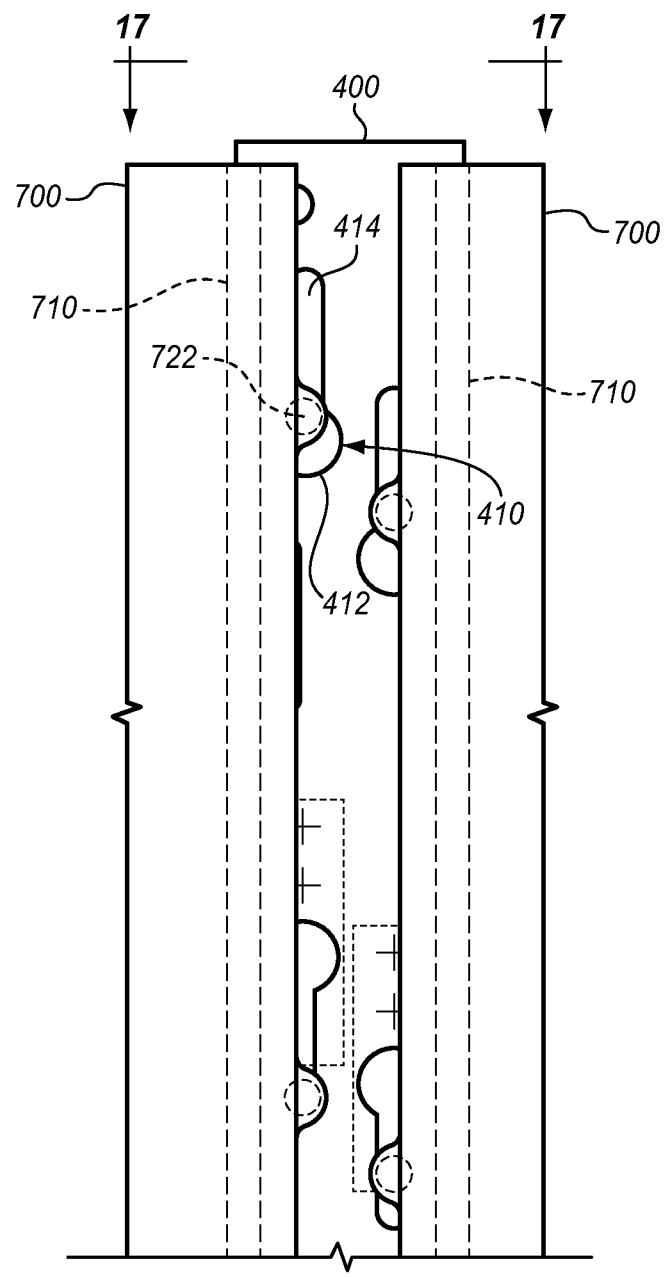
FIG. 10 illustrates a zoomed in portion of sidewalls attached to a hanger in an exemplary embodiment.

FIG. 10 illustrates a zoomed in portion of two sidewalls 700 attached to a hanger 400 in an exemplary embodiment. Specifically, FIG. 10 is a zoomed in view of portion 10 of FIG. 9. As shown in FIG. 10, both sidewalls 700 are attached to hanger 400 by pushing fittings 722 into receptacles 412 of keyholes 410, and then sliding fittings 722 into slots 414 of keyholes 410.

Illustrative details of the installation of a section 700 of sidewall onto a hanger 400 will be discussed with regard to FIG. 11. Assume, for this embodiment, that hangers 400 have been installed on frame elements 310, as shown in FIG. 4. Further, assume that sections 700 of sidewall are awaiting installation onto hangers 400. Each section 700 of sidewall will be installed such that one side is mated with/secured to one hanger 400, while another side is mated with/secured to another hanger 400.

Figure 11:
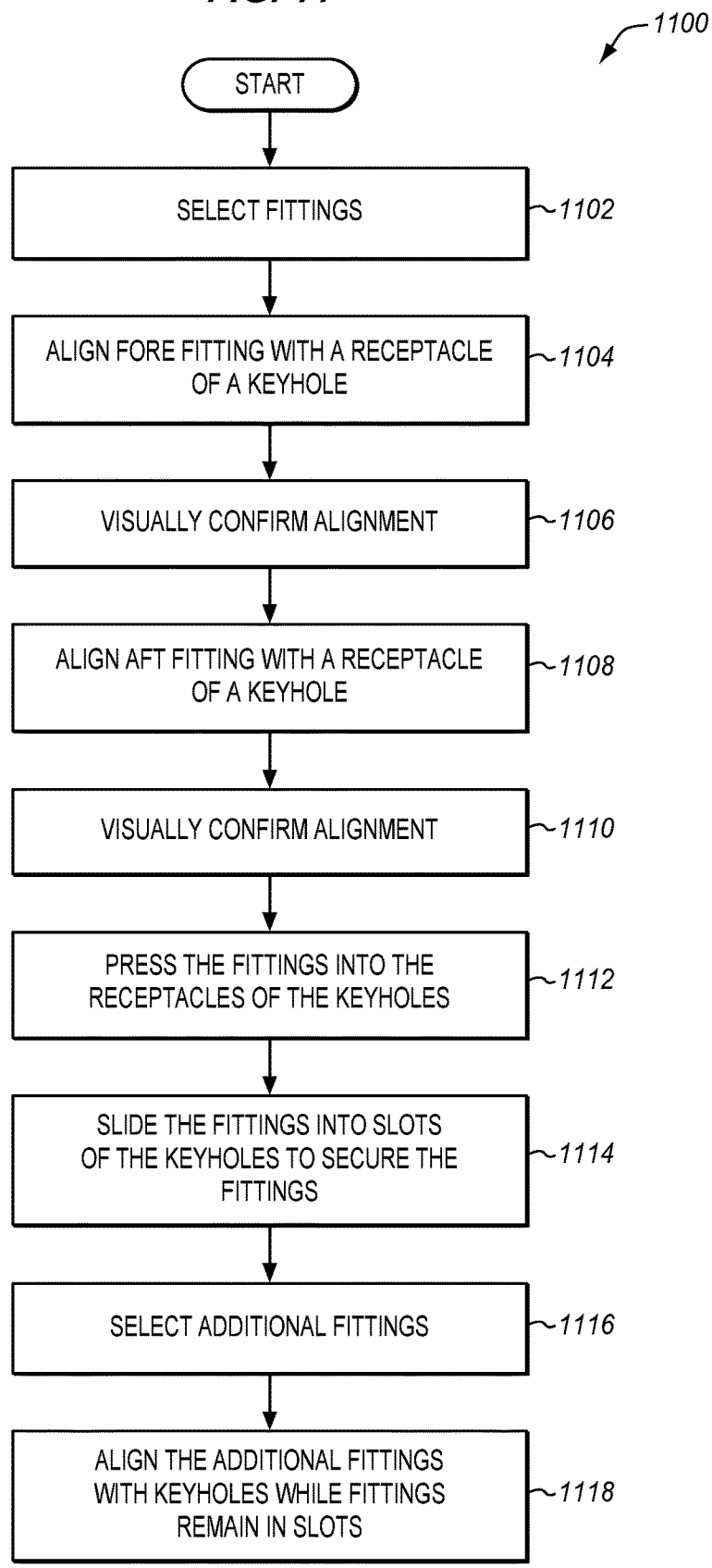
FIG. 11 is a flowchart illustrating a method of installing a section of sidewall of an aircraft in an exemplary embodiment.

FIG. 11 is a flowchart illustrating a method 1100 of installing a section 700 of sidewall of aircraft 100 in an exemplary embodiment. The steps of method 1100 are described with reference to section 700 of FIG. 7, but those skilled in the art will appreciate that method 1100 may be performed in other systems as desired. The steps of the flowcharts described herein are not all inclusive and may include other steps not shown. The steps described herein may also be performed in an alternative order.

The process initiates by selecting a pair of fittings 722 of a section 700 of sidewall, such as the top two fittings 722 shown in FIG. 7 (step 1102). Specifically, one fitting 722 is selected from the left side of section 700 (e.g., an aft fitting), and one fitting 722 is selected from the right side of section 700 (e.g., a fore fitting). The left fitting 722 is aligned with a keyhole 410 at a leftward hanger 610 (step 1104), while the right fitting 722 is aligned with a keyhole 410 at a rightward hanger 620 (step 1108). These alignments may be visually monitored/confirmed (steps 1106, 1110), since keyholes 410 are visible during installation. The pair of fittings 722 are pressed into the receptacles 412 of their corresponding keyholes 410 (step 1110), and the pair of fittings 722 are slid into slots 414 of their corresponding keyholes 410 (step 1112). A second pair of fittings 722 is then selected (e.g., a pair of fittings 722 on sidewall 700 that below the first pair of fittings 722) (step 1114), and the second pair of fittings 722 is aligned with the receptacles of further keyholes 410 on the hangers (610, 620), while the first pair of fittings 722 remain secured in slots of their corresponding keyholes 410 (step 1116). The alignment of the second pair of fittings 722 may also be visually monitored, since again keyholes 410 remain visible.

An exemplary illustration of this process, showing the installation of one side of section 700, is provided at FIGS. 12-16. Specifically, FIGS. 12-15 are zoomed-in views of portion 12 of FIG. 9, as installation proceeds for a section of sidewall.

Figure 12:
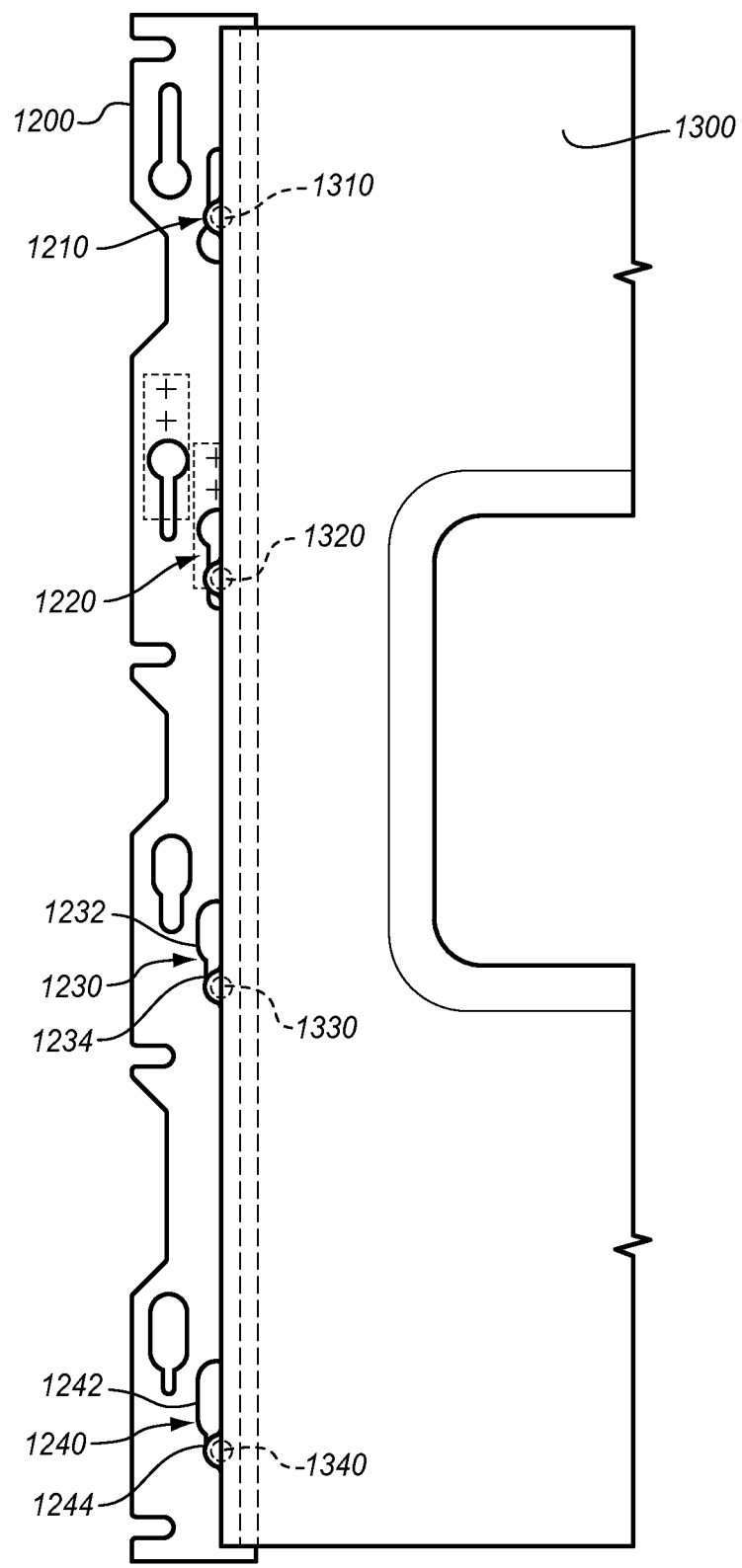
FIGS. 12-16 illustrate attachment of a sidewall to a hanger in an exemplary embodiment.
Figure 13:
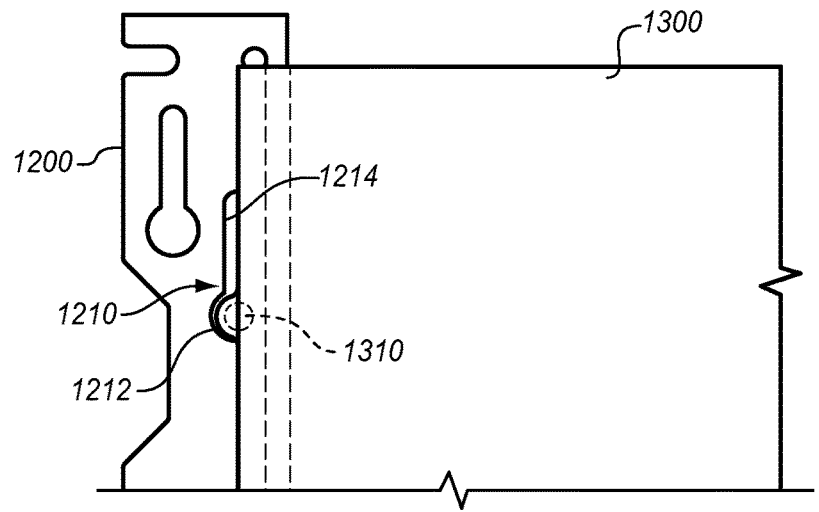
Figure 14:
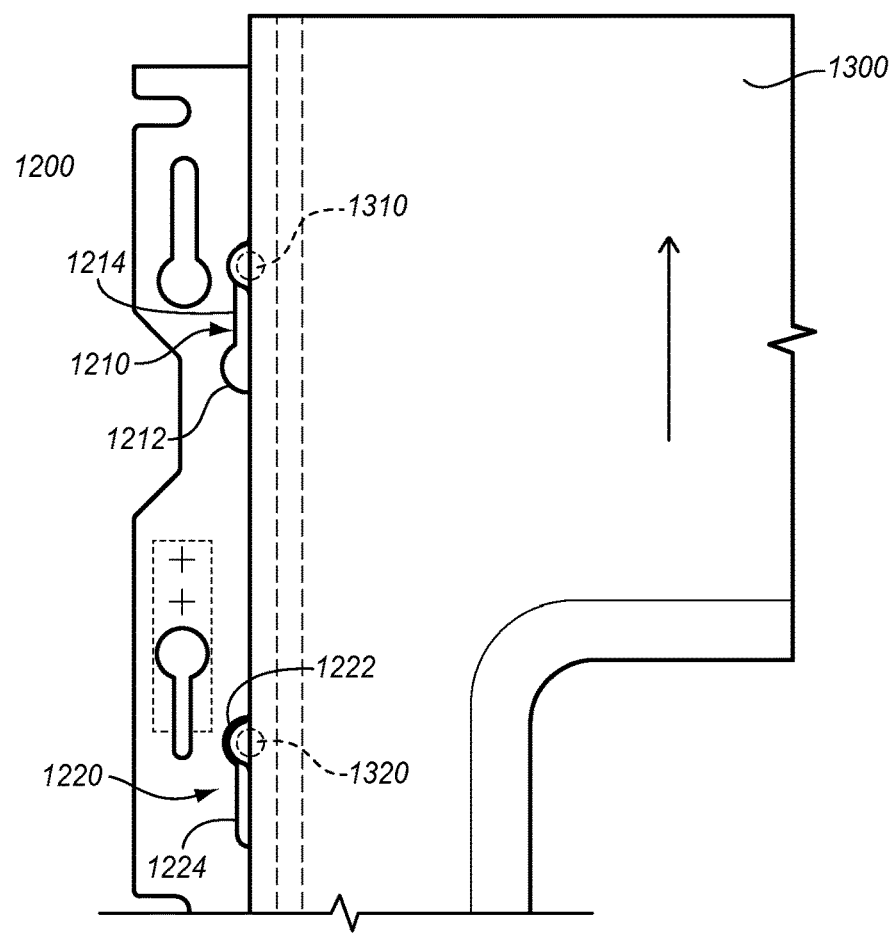
Figure 15:
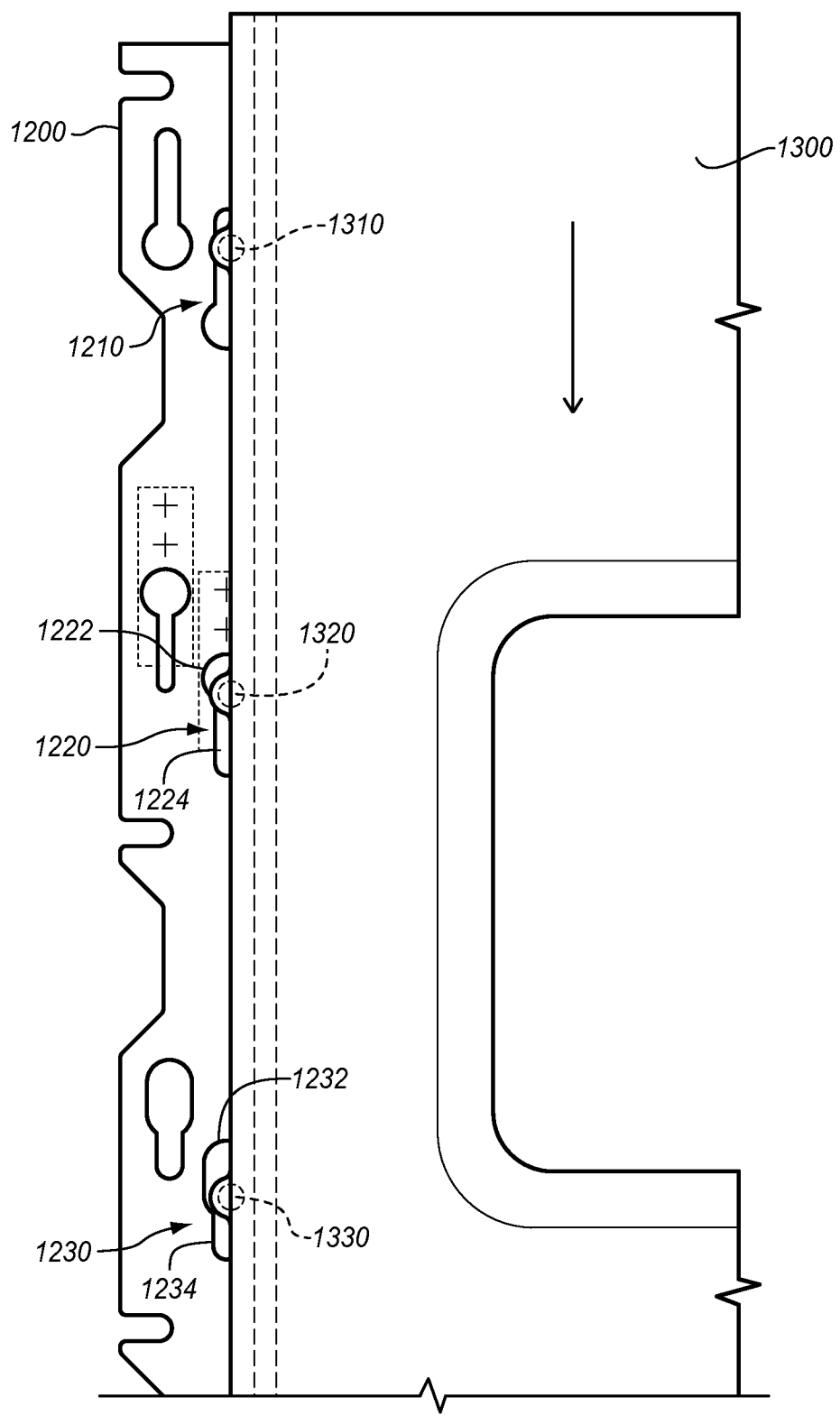
Figure 16:
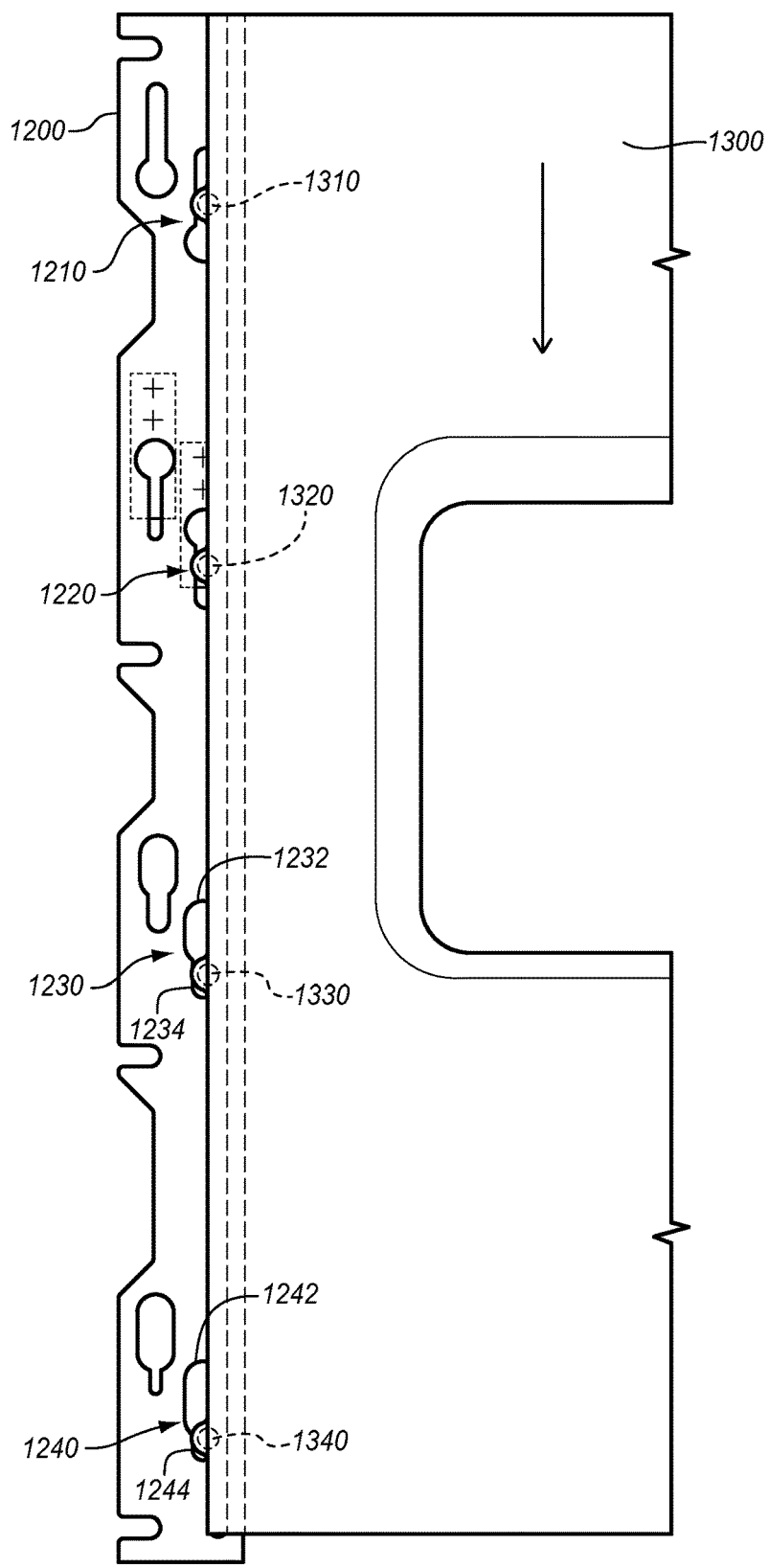

In FIG. 12, a first keyhole 1210 is selected which is vertically inverted with respect to other keyholes 1210 on the right side of hanger 1200 (e.g., other keyholes in the same set), and which has a longer slot 1214 than other keyholes on the right side of hanger 1200. This first keyhole 1210 will be used as an initial securement point for section 1300. To this end, a first fitting 1310 (e.g., a mushroom head fitting) is aligned with receptacle 1212 of the first keyhole 1210 as shown in FIG. 13. In FIG. 14, the first fitting 1310 is slid upwards into slot 1214 of the first keyhole 1210 to secure the first fitting 1310 in place. Below, a second fitting 1320 is aligned with a receptacle 1222 of a second keyhole 1220. Since the slot 1214 of the first keyhole 1210 is longer than the other keyholes, the second fitting 1320 may be aligned while the first fitting 1310 remains secured within the first keyhole 1210.

In a similar fashion as shown in FIG. 14, the second fitting 1320 is slid into slot 1224 of second keyhole 1220 to secure the second fitting 1320 in place as shown, and a third fitting 1330 is aligned with a receptacle 1232 of a third keyhole 1230. Third fitting 1230 may then be slid into slot 1234. This process continues in FIGS. 15-16 for a fourth fitting 1340 and a fourth keyhole 1240 (including receptacle 1242 and slot 1244), to fully secure section 1300 in place. Fittings 1310-1340 may be aligned and installed in pairs, such that while fittings at a left side of section 1300 are installed on a hanger 1200, fittings at a right side of section 1300 are installed onto another hanger 1200.

Utilizing the techniques described above, a technician may rapidly and effectively install sections of sidewall in place onto an airframe, and without the use of tools. Furthermore, a technician may "walk" sections of a sidewall into a hanger, securing one portion of the sidewall at a time without having to insert all fittings at once. Still further, because the alignment of keyholes and fittings is visible at the time of attachment, the technician is provided with visual cues for aligning sections of sidewall.

Figure 17:
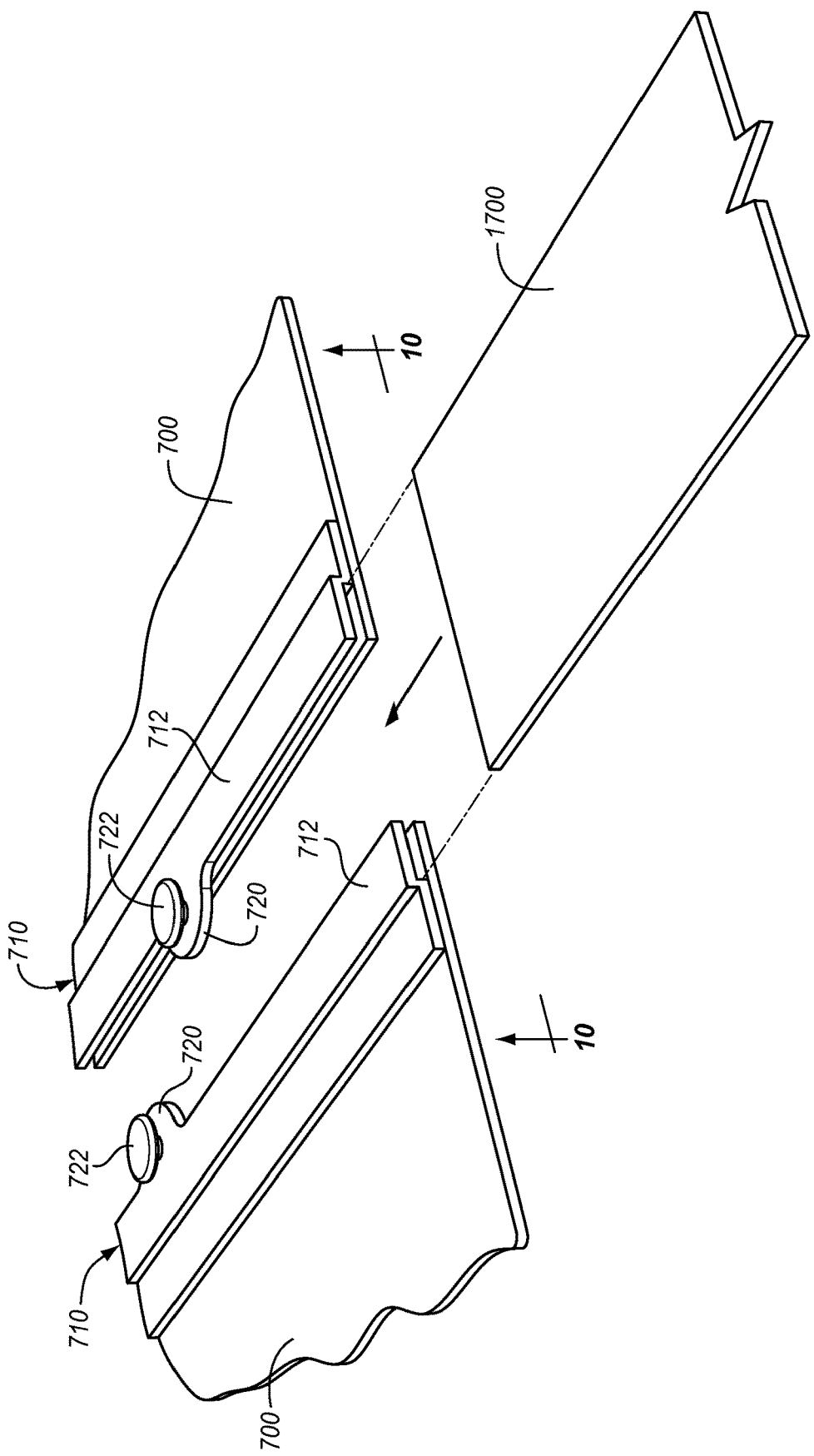
FIG. 17 illustrates attachment of a gap cover in an exemplary embodiment.

FIGS. 17-21 describe exemplary additional features and details for use with sections of sidewall in various exemplary embodiments. For example, FIG. 17 illustrates attachment of a gap cover 1700 in an exemplary embodiment. Specifically, FIG. 17 illustrates a rotated and translated view relating to view arrows 17 of FIG. 10. Gap cover 1700 is slid between raised portions 712 of retaining elements 710, which masks the presence of a hanger (not shown) from view. A gap cover such as the gap cover 1700 of FIG. 17 may therefore be utilized to enhance the cosmetic appearance of an interior of an aircraft, may be used to restrict access to structural components of the aircraft by passengers, or to serve any other suitable purpose.

Figure 18:
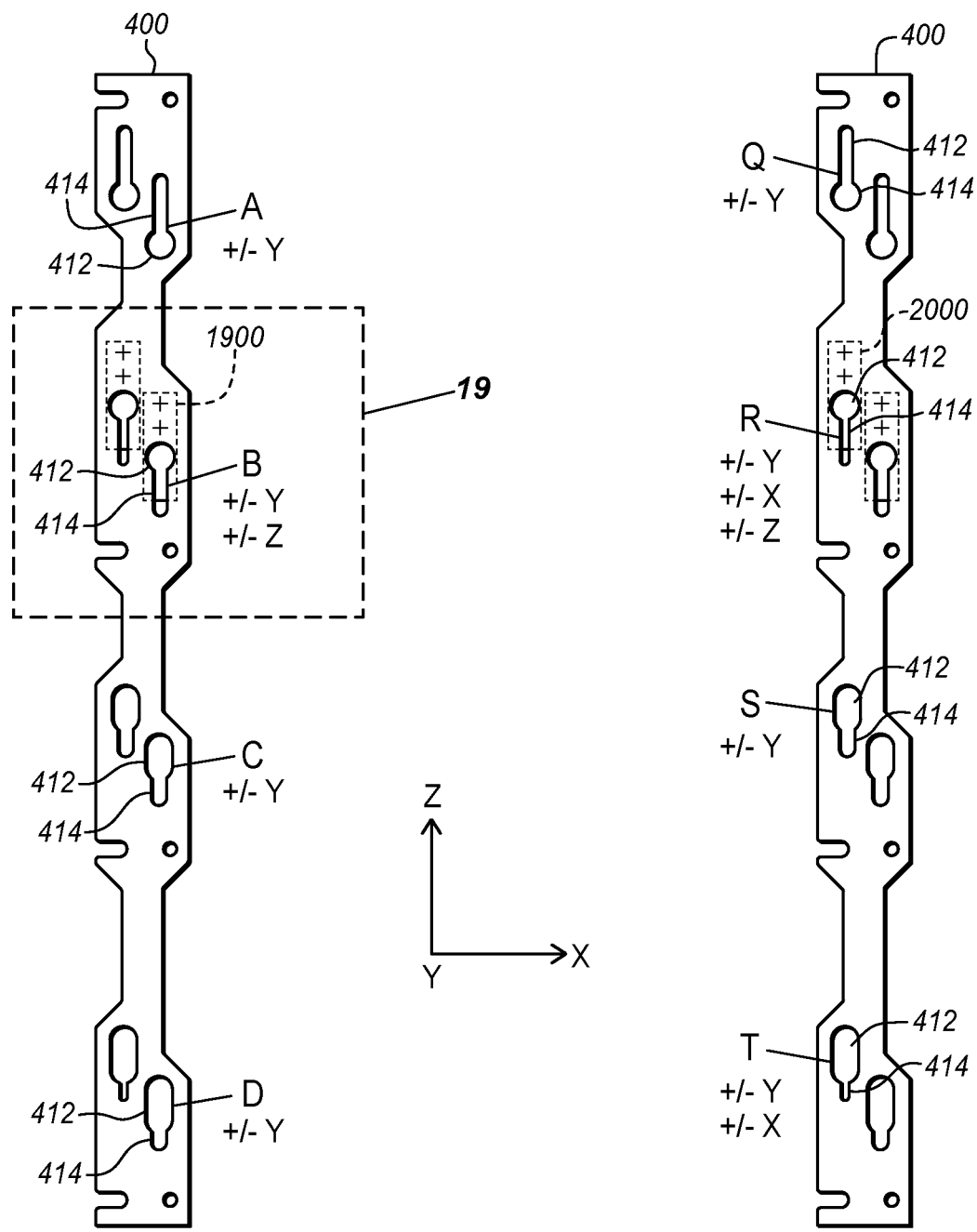
FIG. 18 illustrates restriction of sidewall motion via multiple hangers in an exemplary embodiment.

FIG. 18 illustrates restriction of sidewall motion via multiple hangers in an exemplary embodiment. As shown in FIG. 18, keyhole (A) has a wide, long slot 414, and serves primarily to restrict motion of a section 700 of sidewall in the Y direction (i.e., into or out of the page). Keyhole (B) has a slightly shorter slot 414 than A, and includes a locking clip 1900 (described in FIGS. 19-21) for restricting motion in the Z direction. Keyhole (C) has a shorter slot 414 than B, but a longer receptacle 412, and secures a section of sidewall to restrict motion in the Y direction. The longer receptacle 412 enables a fitting to be aligned with C, even after fittings have been secured to A and B. Keyhole (D) has a shorter slot 414 than C, and a longer receptacle 412 than C. Just like C, D restricts motion of a sidewall in the Y direction.

Keyholes Q, R, S, and T exhibit similar receptacle lengths and slot lengths to their counterparts with which they are paired. That is, Q exhibits a similar geometry to A, R to B, S to C, and T to D. However, R and T have slots 414 that exhibit narrower/smaller slot widths than their corresponding keyholes B and D. R and T also have slots 414 that are smaller/narrower than other keyholes in their corresponding set (comprising keyholes Q, R, S, and T). The narrow width of these slots 414 helps to restrict motion of a section of sidewall in the X direction. In this manner, when a section of sidewall is affixed to keyholes A-D and Q-T, its motion along all three axes is restricted, and the section is retained in place.

Furthermore, since six of eight key holes per sidewall have a wide slot, the initial alignment of the section is minimally constrained, which helps to account for fore/aft deviations in spacing between hangers 400 as those hangers 400 are installed. The wider slots effectively allow frame elements 310 to be assembled at extreme allowable tolerances while still allowing a section of sidewall to be installed, because these six key holes (A, B, C, D, Q, and S) allow a wide mushroom fitting to float in the X direction during installation. A wide/large diameter mushroom fitting allows float foreward and aftward in the wide slot while still retaining a section of sidewall in the Y direction. In one embodiment, the diameters of the mushroom fittings for the narrow slots are made smaller than the other mushroom fittings. The two narrow slots that locate the sidewall in the X direction are slots R & T. In the vertical direction, the sidewall is located with key holes B and R. All the other key holes (A, C, D, Q, S and T) allow vertical float. This combination of floating and constrained features that allow the sidewall to install easier with variations in the frame tolerance, because as alignments are made and fittings are secured, the amount of float in the section of sidewall is progressively reduced.

Keyholes A, B, C, and D form a set of keyholes configured to secure a left side of a section of sidewall, while Keyholes Q, R, S, and T form a set of keyholes configured to secure a right side of the section of sidewall.

Figure 19:
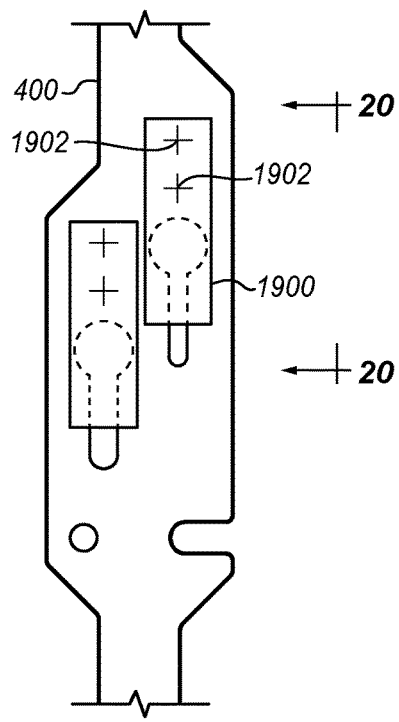
FIGS. 19-21 are views illustrating a locking clip for securing a sidewall to a hanger in an exemplary embodiment.
Figure 20:
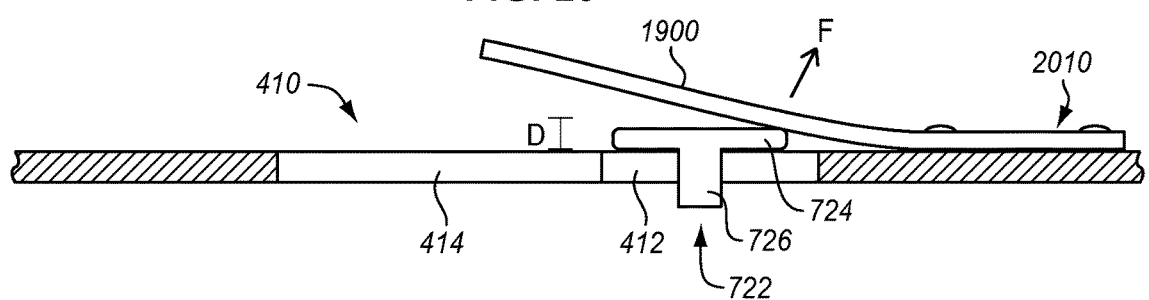
Figure 21:
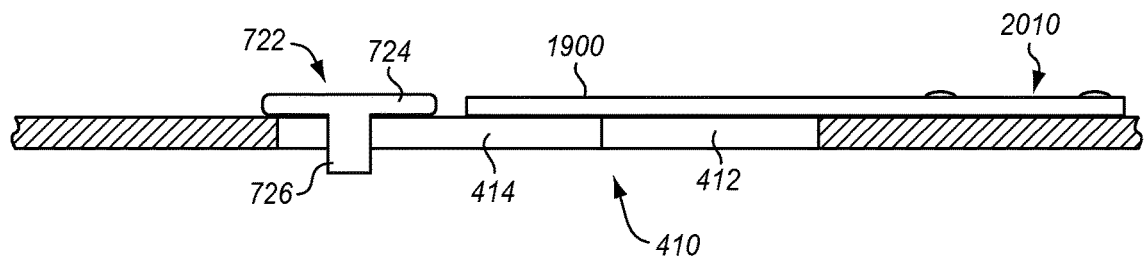

FIGS. 19-21 are views illustrating a locking clip 1900 for securing a sidewall to a hanger in an exemplary embodiment. Specifically, while FIG. 18 is a front view of hangers 400, FIG. 19 is a zoomed in back view of portion 19 of FIG. 18. From this view, it may be understood that locking clip 1900 is securely attached to hanger 400 at locations 1902. FIGS. 20-21 are section cut views shown by view arrows 20 of FIG. 19 in an exemplary embodiment. In FIG. 20, it may be seen that when fitting 722 (comprising barrel 726 and head 724) is pressed into receptacle 412 of a keyhole 410, the resulting force (F) elastically deflects locking clip 1900. Locking clip 1900 remains retained because of its fixation at location 2010. As shown in FIG. 21, when fitting 722 slides into slot 414, head 724 retains fitting 722 secured in slot 414. The passage of head 724 enables locking clip 1900 to return to its original position via elastic force, securing/engaging locking clip 1900 and trapping fitting 722 in place at slot 414.

EXAMPLES

Figure 22:
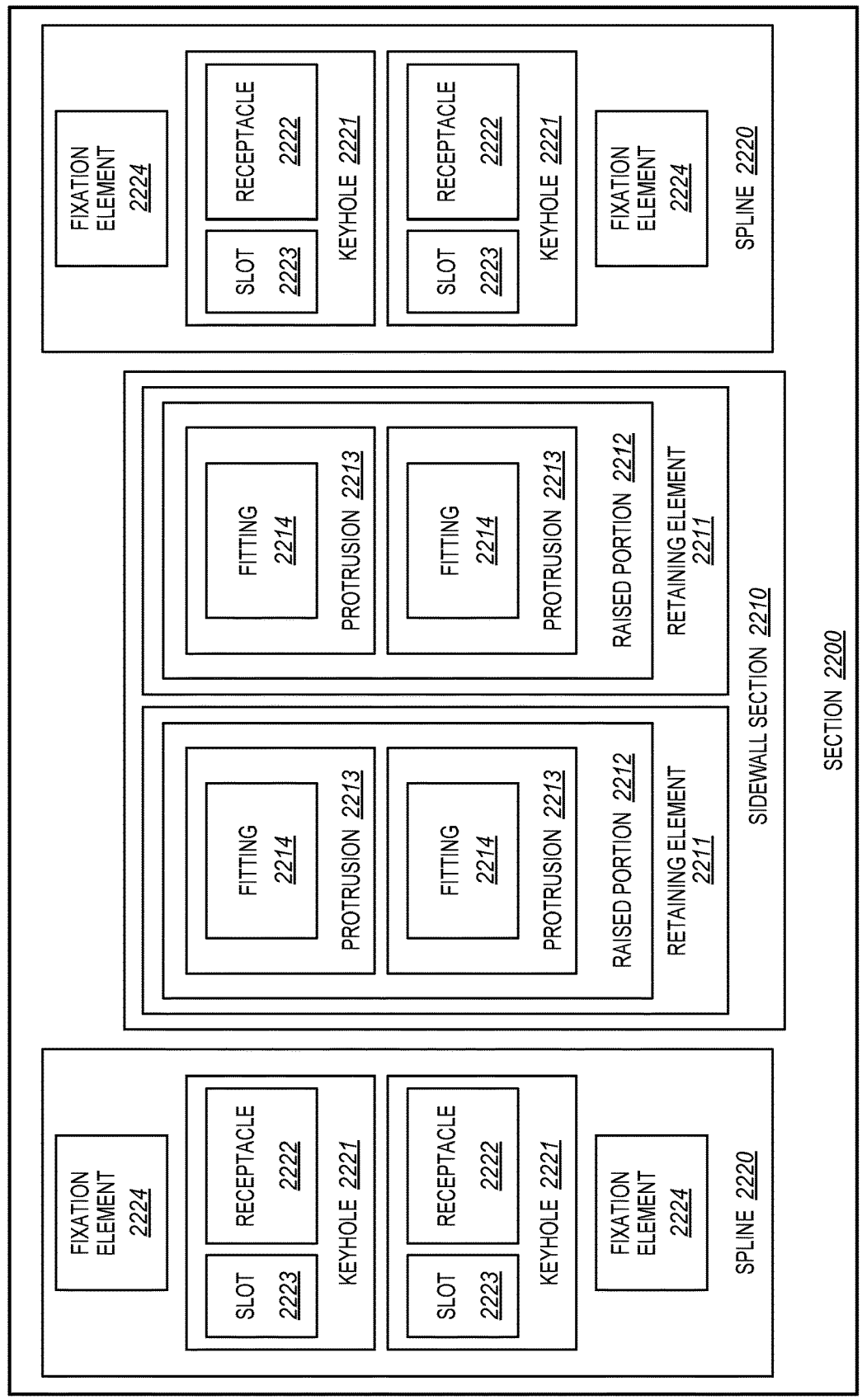
FIG. 22 is a block diagram of a section of an aircraft in an exemplary embodiment.

FIG. 22 is a block diagram of a section 2200 of an aircraft in an exemplary embodiment. According to FIG. 22, section 2200 includes sidewall section 2210, which includes multiple retaining elements 2211 (one on each side). Each retaining element includes a raised portion 2212, upon which multiple protrusions 2213 are positioned. Each protrusion 2213 includes a fitting 2214 (e.g., a mushroom fitting) dimensioned to mate with a corresponding keyhole 2221 of a spline/hanger 2220. Splines 2220 include multiple keyholes 2221 for attachment to sidewall section 2210, and may include additional keyholes 2221 for attachment to other sections of sidewall. In this embodiment, splines 2220 each include fittings 2224 to enable attachment to a frame element of an aircraft. Additionally, for each keyhole 2221, a slot 2223 and a receptacle 2222 are defined. Utilizing these mechanical features, a user may reliably attach sidewall section 2210 to an aircraft in a manner that is tool-less and capable of accepting minor variations in airframe dimension.

Figure 23:
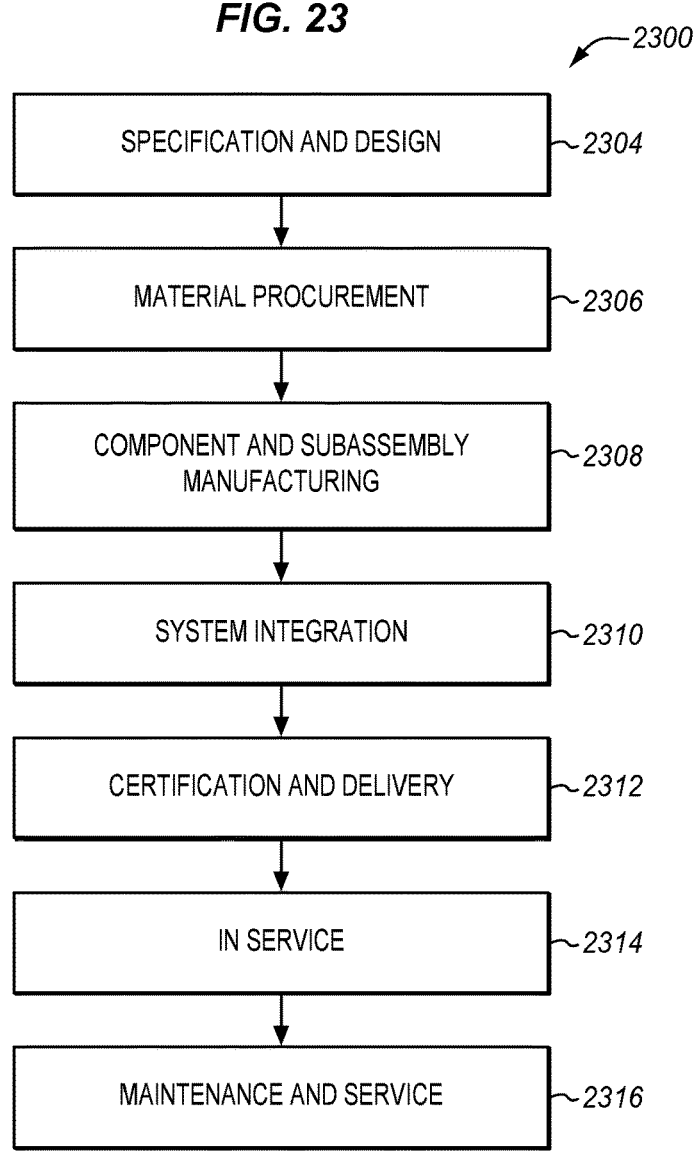
FIG. 23 is a flow diagram of aircraft production and service methodology in an exemplary embodiment.
Figure 24:
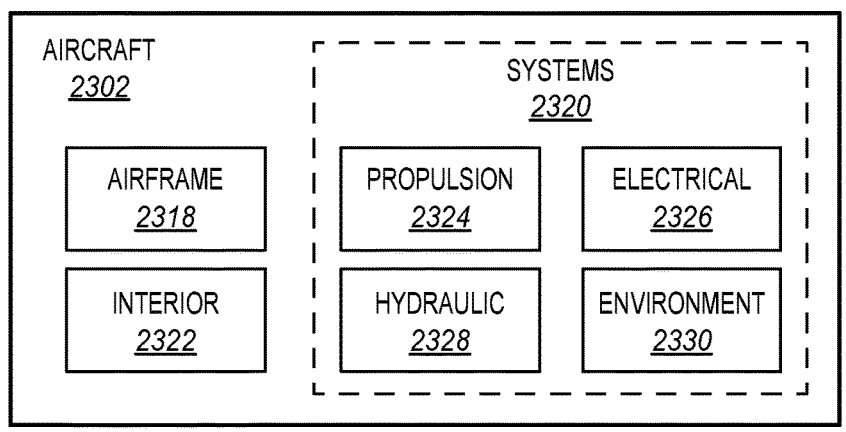
FIG. 24 is a block diagram of an aircraft in an exemplary embodiment.

Referring more particularly to the drawings, embodiments of the disclosure may be described in the context of an aircraft manufacturing and service method 2300 as shown in FIG. 23 and an aircraft 2302 as shown in FIG. 24. During pre-production, exemplary method 2300 may include specification and design 2304 of the aircraft 2302 and material procurement 2306. During production, component and subassembly manufacturing 2308 and system integration 2310 of the aircraft 2302 takes place. Thereafter, the aircraft 2302 may go through certification and delivery 2312 in order to be placed in service 2314. While in service by a customer, the aircraft 2302 is scheduled for routine maintenance and service 2316 (which may also include modification, reconfiguration, refurbishment, and so on).

Each of the processes of method 2300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 24, the aircraft 2302 produced by exemplary method 2300 may include an airframe 2318 with a plurality of systems 2320 and an interior 2322. Examples of high-level systems 2320 include one or more of a propulsion system 2324, an electrical system 2326, a hydraulic system 2328, and an environmental system 2330. Any number of other systems may be included. Although an aerospace example is shown, the principles of the invention may be applied to other industries, such as the automotive industry.

Apparatus and methods embodied herein may be employed during any one or more of the stages of the production and service method 2300. For example, components or subassemblies corresponding to production stage 2308 may be fabricated or manufactured in a manner similar to components or subassemblies produced while the aircraft 2302 is in service. Also, one or more apparatus embodiments, method embodiments, or a combination thereof may be utilized during the production stages 2308 and 2310, for example, by substantially expediting assembly of or reducing the cost of an aircraft 2302. Similarly, one or more of apparatus embodiments, method embodiments, or a combination thereof may be utilized while the aircraft 2302 is in service, for example and without limitation, to maintenance and service 2316. For example, the techniques and systems described herein may be used for steps 2306, 2308, 2310, 2314, and/or 2316, and/or may be used for airframe 2318 and/or interior 2322.

In one embodiment, hangers 400 are affixed to airframe 118, and are manufactured during component and subassembly manufacturing 1108. Hangers 400 may then be assembled into an aircraft in system integration 1110 to affix sections 700 of sidewall, and then be utilized in service 1114 until wear renders one or more hangers 400 unusable. Then, in maintenance and service 1116, hangers 400 may be discarded and replaced with newly manufactured hangers 400.

Any control elements (if any) shown in the figures or described herein may be implemented as hardware, a processor utilizing software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method for installing a section of aircraft sidewall, the method comprising:
   aligning a fitting in a section of aircraft sidewall with a keyhole in a hanger attached to a frame element of an aircraft;
   visually monitoring alignment of the fitting with the keyhole;
   pressing the fitting into a receptacle of the keyhole; and
   sliding the fitting into a slot of the keyhole to secure the fitting in the keyhole.

2. The method of claim 1 further comprising:
   engaging a locking clip to hold the fitting within the slot of the keyhole.

3. The method of claim 1 further comprising:
   installing a gap cover that obscures the keyhole from view.

4. The method of claim 1 further comprising:
   aligning an additional fitting in the section with an additional keyhole in the hanger;
   visually monitoring alignment of the additional fitting with the additional keyhole;
   pressing the additional fitting into a receptacle of the additional keyhole; and
   sliding the additional fitting into a slot of the additional keyhole to secure the additional fitting in the additional keyhole.

5. The method of claim 4 wherein:
   the additional keyhole is vertically inverted with respect to the keyhole.

6. The method of claim 4 wherein:
   the additional keyhole has a longer slot than the keyhole.

7. A method for installing a section of aircraft sidewall, the method comprising:
   aligning a first fore fitting of a section of aircraft sidewall with a receptacle of a keyhole of a first hanger affixed to an airframe while visually monitoring alignment of the first fore fitting with the keyhole of the first hanger; and
   aligning a first aft fitting of the section with a receptacle of a keyhole of a second hanger affixed to the airframe while visually monitoring alignment of the first aft fitting with the keyhole of the second hanger.

8. The method of claim 7 further comprising:
   engaging a locking clip to hold the fitting within the slot of the keyhole.

9. The method of claim 7 further comprising:
   installing a gap cover that obscures the keyhole from view.

10. The method of claim 7 further comprising:
    aligning an additional fore fitting of the section with a receptacle of an additional keyhole while the first fore fitting remains within a corresponding slot of the keyhole and while visually monitoring alignment of the additional fore fitting with the additional keyhole.

11. The method of claim 10 wherein:
    the additional keyhole is vertically inverted with respect to the keyhole.

12. The method of claim 10 wherein:
    the additional keyhole has a longer slot than the keyhole.

13. A method for installing a section of aircraft sidewall, the method comprising:
    aligning a first fore fitting of a section of aircraft sidewall with a receptacle of a keyhole of a first hanger affixed to an airframe;
    aligning a first aft fitting of the section with a receptacle of a keyhole of a second hanger affixed to the airframe;
    pressing the first fore fitting and the first aft fitting into the receptacles of the keyholes;
    sliding the first fore fitting and the first aft fitting into slots of the keyholes to secure the fittings in the keyholes;
    aligning an additional fore fitting of the section of aircraft sidewall with a receptacle of a keyhole while the first fore fitting remains within a corresponding slot, progressively reducing an amount of float experienced by the section with respect to the hangers; and
    aligning an additional aft fitting of the section of aircraft sidewall with a receptacle of a keyhole of while the first aft fitting remains within a corresponding slot, further progressively reducing the amount of float experienced by the section with respect to the hangers.

14. The method of claim 13 further comprising:
    visually monitoring alignment of the first fore fitting with a keyhole; and
    visually monitoring alignment of the first aft fitting with a keyhole.

15. The method of claim 13 further comprising:
    engaging a locking clip to hold one of the fittings within a slot of a keyhole.

16. The method of claim 13 further comprising:
    engaging a fixation element of the first hanger to a frame element of the aircraft.

17. The method of claim 13 further comprising:
installing a gap cover that obscures the keyholes from view.

18. The method of claim 13 wherein:
the first fore fitting and the first aft fitting are inserted into keyholes that are vertically inverted with respect to other keyholes.

19. The method of claim 18 wherein:
the inverted keyholes have longer slots than the other keyholes.

20. The method of claim 18 wherein:
The first fore fitting and the first aft fitting are part of a cabin of the aircraft.

* * * * *